United States Patent [19]

Tanaka

[11] Patent Number: 5,268,970
[45] Date of Patent: Dec. 7, 1993

[54] ANTI-VIBRATION LINEAR MOTION GUIDE UNIT

[75] Inventor: Kazuhiko Tanaka, Fuchu, Japan

[73] Assignee: Nippon Thompson Co., Ltd., Japan

[21] Appl. No.: 722,646

[22] Filed: Jun. 28, 1991

[30] Foreign Application Priority Data

Jun. 29, 1990 [JP] Japan .................... 2-69152[U]

[51] Int. Cl.$^5$ .............................. F16C 29/06
[52] U.S. Cl. ........................ 384/43; 384/25
[58] Field of Search .................... 384/43–45, 384/25

[56] References Cited

U.S. PATENT DOCUMENTS

| 4,662,762 | 5/1987 | Schwarz | 384/25 |
| 4,773,770 | 9/1988 | Osawa et al. | 384/45 |
| 4,940,339 | 7/1990 | Amano | 384/44 X |
| 4,968,155 | 11/1990 | Bode | 384/45 |
| 5,011,300 | 4/1991 | Teramachi | 384/45 X |
| 5,013,164 | 5/1991 | Tsukada | 384/45 |

FOREIGN PATENT DOCUMENTS 58-6010  1/1983  Japan .
61-116119 6/1986  Japan .

*Primary Examiner*—Thomas R. Hannon
*Attorney, Agent, or Firm*—Skjerven, Morrill, MacPherson, Franklin & Friel

[57] ABSTRACT

An anti-vibration linear motion rolling contact guide unit includes a rail, a slider assembly, a plurality of rolling members interposed between the rail and the slider assembly to thereby provide a rolling contact between the rail and the slider assembly, and at least one anti-vibration block fixedly attached to one end of the slider assembly. The rail has a sliding guide surface and the anti-vibration block includes an anti-vibration mechanism which includes a friction member which is preferably provided with a contact sheet at its forward end and slidably fitted in a hole formed in the anti-vibration block. The friction member is biased toward the sliding guide surface of the rail by means of a biasing means which is also fitted in the hole. An adjusting screw is screwed into a threaded portion of the hole so as to adjust the location of the biasing means which is in contact with and thus applies a force to the friction member. With this structure, any vibration between the rail and the slider assembly can be advantageously absorbed.

8 Claims, 4 Drawing Sheets

ANTI-VIBRATION LINEAR MOTION GUIDE UNIT

BACKGROUND OF THE INVENTION

1. Field of the Invention

This invention generally relates to a linear motion rolling contact guide unit, and, in particular, to an anti-vibration linear motion guide unit particularly suitable for use as a drive unit in various machines, such as machining tools, precision processing apparatuses and testing equipment.

2. Description of the Prior Art

A linear motion guide unit having an anti-vibration function is well known as disclosed in the Japanese Utility Model Laid-open Pub. No. 58-6010 and Pat. Laid-open Pub. No. 61-116119. A linear motion guide unit generally includes a rail extending over a desired length, a slider assembly slidably mounted on the rail and a plurality of rolling members interposed between the rail and the slider assembly. In one form of the prior art linear motion guide unit having an anti-vibration function, a friction member is resiliently interposed under pressure between the rail and the slider assembly. In another form of the prior art linear motion guide unit having an anti-vibration function, a dedicated anti-vibration unit is arranged between a pair of ordinary linear motion guide units and a fine gap defined between the dedicated anti-vibration unit and the rail is filled with a lubricant oil to thereby provide a fluiddynamic damper. However, in the former case, since both of the rolling members and the friction member are disposed in the same housing of the slider assembly, there is a limitation in locating the friction member, which in turn imposes limitations in attaining anti-vibration and braking functions and tends to make the structure complicated. In the latter case, because of leakage, difficulty exists in keeping a required amount of lubricating oil in the desired gap.

SUMMARY OF THE INVENTION

In accordance with the present invention, there is provided a linear motion guide unit having an anti-vibration function, which generally includes a rail, a slider assembly and a plurality of rolling members interposed between the rail and the slider assembly. The present linear motion guide unit also includes an anti-vibration block which is fixedly attached to an end of the slider assembly. Preferably, such an anti-vibration block is fixedly attached to each of the front and rear ends of the slider assembly.

The anti-vibration block includes a friction member having a contact sheet comprised of a low friction material fixedly attached at one end such that the contact sheet may be brought into frictional contact with a predetermined surface of the rail. The anti-vibration block also includes an urging means, such as a spring or rubber, for urging the friction member against the rail so that the contact sheet is pressed against the rail. Preferably, the anti-vibration block includes a center plate of a first predetermined shape and a pair of side plates of a second predetermined shape sandwiching the center plate. A cavity is defined by a combination of these center and side plates and the friction member is slidably fitted into the cavity. The urging means is located at the back of the friction member so that the friction member may be kept in contact with the rail under pressure. Preferably, a threaded hole is provided in the center plate in alignment with the cavity and thus an adjusting screw may be threaded into the threaded hole with its one end in abutment against the urging means. In the preferred embodiment, an intermediate member is placed between the urging means and the adjusting screw.

The contact sheet fixedly attached at the forward end of the friction member is preferably comprised of such a material as a synthetic resin, a composite material between a metal and a synthetic resin, or a composite material between a metal and a chemical compound.

As described above, since the anti-vibration block is fixedly attached to at least one end of the slider assembly, the linear motion guide unit is prevented from being set in vibration during sliding motion and thus the sliding resistance is prevented from increasing and a smooth sliding operation along the rail is insured. In addition, since the friction member is in pressure contact with the rail through the contact sheet attached at its forward end, the linear motion guide unit can be rapidly brought to a halt through a braking function of the friction member. Besides, since an anti-vibration function can be provided simply by providing an additional anti-vibration block to any existing linear motion guide unit, it is extremely simple in structure and easy to manufacture.

It is therefor a primary object of the present invention to provide an improved linear motion guide unit having an anti-vibration function.

Another object of the present invention is to provide an anti-vibration linear motion guide unit simple in structure, easy to manufacture and low at cost.

A further object of the present invention is to provide an anti-vibration linear motion guide unit high in performance and positioning accuracy and smooth in operation.

A still further object of the present invention is to provide an anti-vibration linear motion guide unit capable of maintaining a desired anti-vibration function for an extended period of time.

Other objects, advantages and novel features of the present invention will become apparent from the following detailed description of the invention when considered in conjunction with the accompanying drawings.

DESCRIPTION OF THE PREFERRED EMBODIMENTS

Figure 1:
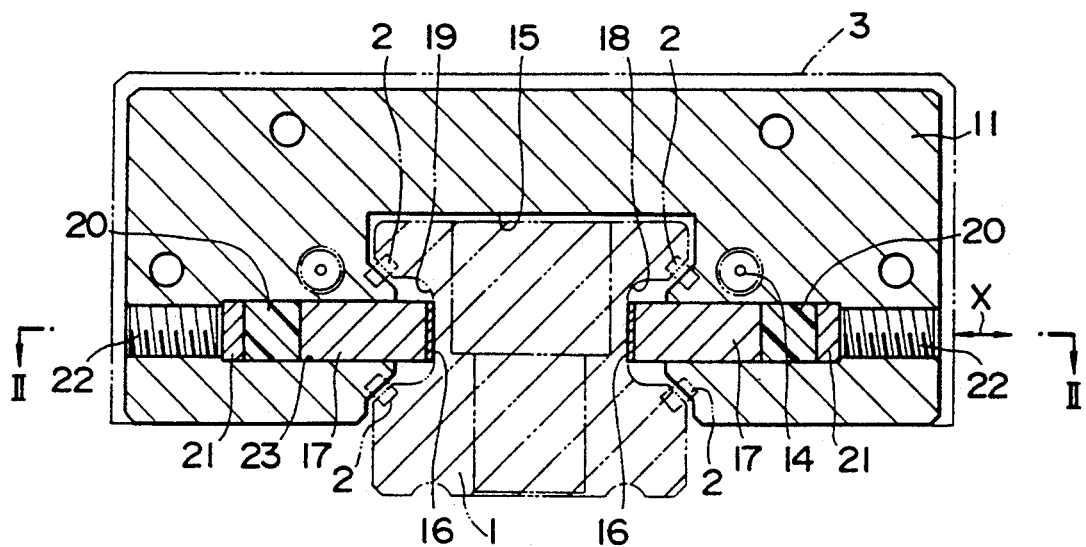
FIG. 1 is a schematic illustration showing in transverse cross section an anti-vibration linear motion guide unit constructed in accordance with one embodiment of the present invention.
Figure 3:
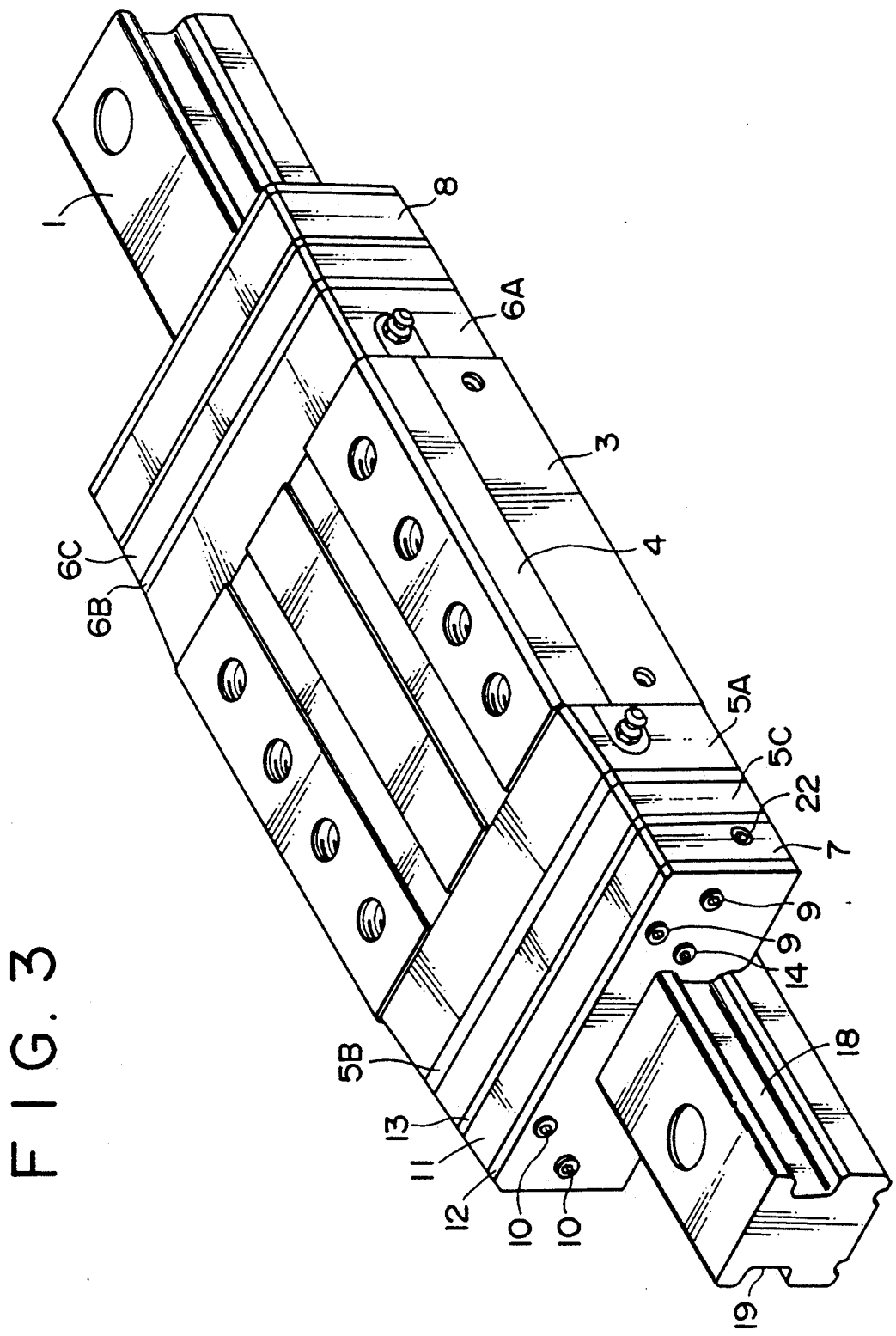
FIG. 3 is a schematic illustration showing in perspective view an anti-vibration linear motion guide unit constructed in accordance with one embodiment of the present invention.

Referring first to FIG. 3, there is schematically shown an anti-vibration linear motion guide unit constructed in accordance with one embodiment of the present invention. As shown, the present anti-vibration linear motion guide unit generally includes a rail 1, a slider assembly 3, a plurality of rolling members 2 (rollers in FIG. 1) and a pair of anti-vibration blocks 7 and 8.

The rail 1 extends generally straight over a desired length. In the illustrated embodiment, the rail 1 is generally rectangular in shape and formed with a guide groove 18 or 19 at each side surface thereof. The guide groove 18 or 19 is generally U-shaped in cross section and is formed with a slant surface at its top and bottom edges, whereby the slant surface provides a guide surface to the rollers 2 to provide a rolling contact between the rail 1 and the slider assembly 3. On the other hand, the guide groove 18 or 19 provides a sliding guide surface to a friction member of an anti-vibration mechanism which will be described in detail later.

The slider assembly 3 has a typical conventional structure of any prior art linear motion guide unit and thus is generally U-shaped in cross section as well known for those skilled in the art. The slider assembly 3 straddles the rail with a predetermined gap therebetween and it is formed with two pairs of endless circulating paths, each including a load path section, a return path section and a pair of curved connecting path sections connecting corresponding ends of the load and return path sections as well known in the art and each being filled with the rolling members 2 or rollers in the instant embodiment. The load path section of each of the endless circulating path has an elongated window located opposite to a corresponding one of the slant guide surfaces so that those rollers located in the load path section are partly exposed through the elongated window and thus in rolling contact with the corresponding slant guide surface. In this manner, a rolling contact is established between the rail 1 and the slider assembly 3 so that the slider assembly 3 may move along the rail 1 in any direction and over any distance.

In the illustrated embodiment, the slider assembly 3 includes a main body 4 and a pair of end blocks 5A and 6A on both ends thereof. As well known in the art, the main body 4 is formed with the load and return path sections of each of the endless circulating paths, and each of the end blocks 5A and 6A is formed with the curved connecting path section. Thus, when the end blocks 5A and 6A are attached to the respective end surfaces of the main body 4, endless circulating paths are completed. An end seal plate 5B or 6B is attached to the end surface of the end block 5A or 6A. And, a metal intermediate plate 5C or 6C is attached to the seal plate 5B or 6B. And, an anti-vibration block 7 or 8 is fixedly attached to the metal intermediate plate 5C or 6C through bolts 9 and 10. Thus, in the illustrated embodiment, there are provided two anti-vibration blocks 7 and 8 on the front and rear ends, respectively.

Figure 2:
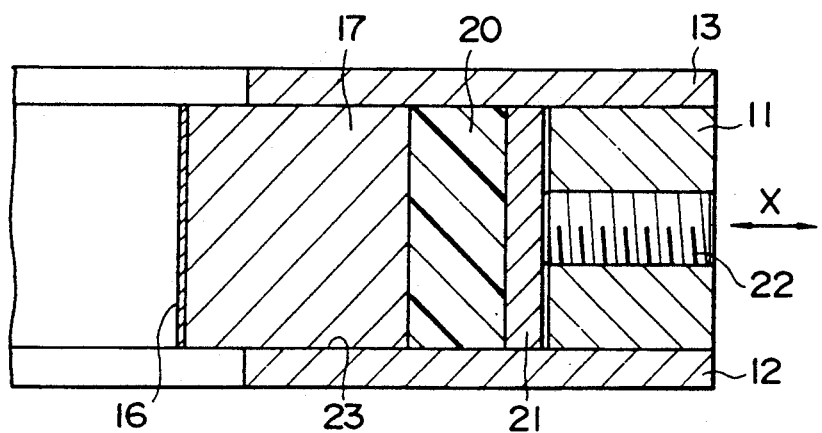
FIG. 2 is a schematic illustration showing on a somewhat enlarged scale an anti-vibration mechanism provided in the linear motion guide unit shown in FIG. 1.

The anti-vibration block 7 or 8 includes a center plate 11 and a pair of side plates 12 and 13 which are disposed to sandwich the center plate 11, and these plates 11 through 13 are combined together by bolts 14. These plates 11 through 13 are all generally U-shaped in cross section with the center plate 11 having a first predetermined shape and the side plates 12 and 13 having a second predetermined shape which somewhat differs from the first predetermined shape. Each of the plates 11 through 13 has a cut-way portion 15 which generally commensurates with the shape of the rail 1 so that the plates 11 through 13 may be placed in a straddling manner. As shown in FIG. 2, when these plates 11 through 13 are combined, a cavity 23 is defined. In the cavity 23 is slidably disposed a friction member 17 which is preferably comprised of a metal, rigid synthetic resin or the like. At the forward end surface of the friction member 17 is fixedly attached a contact sheet 16 which is brought into a sliding contact with a corresponding one of the sliding guide surfaces 18 and 19 and which is preferably comprised of a low friction material, such as synthetic resin, a composite material including a metal and a synthetic resin or a composite material including a metal and a chemical compound.

An elastic member 20, such as a spring or rubber, is also disposed in the cavity 23 in abutment with the base end of the friction member 17. An intermediate or buffer member 21 comprised, for example, of a metal, rigid synthetic resin, or the like is also disposed in the cavity 23 in abutment against the opposite surface of the elastic member 20. In addition, an adjusting screw 22 is screwed into a threaded hole provided in a portion of the center plate 11 with its forward end in engagement with the rear surface of the buffer member 21. Since the adjusting screw 22 may move forward or backward through a screwing operation as indicated by a double arrow X indicated in FIG. 2, a force may be applied to the friction member 17 through the buffer member 21 and the elastic member 20 such that the contact sheet 16 of the friction member 17 is brought into sliding contact with a corresponding one of the sliding guide surfaces 18 and 19 under pressure. With this structure, since the friction member 17 may be normally kept in sliding contact with the rail 1 under pressure, any possible vibration tending to occur in the present linear motion guide unit can be immediately absorbed by the elastic member 20 so that the present linear motion guide unit can be maintained free of vibration at all times. In addition, because of the provision of the adjustable screw 22, the contact pressure can be set at any desired value, which can be maintained at constant by the elastic member 20.

Figure 4:
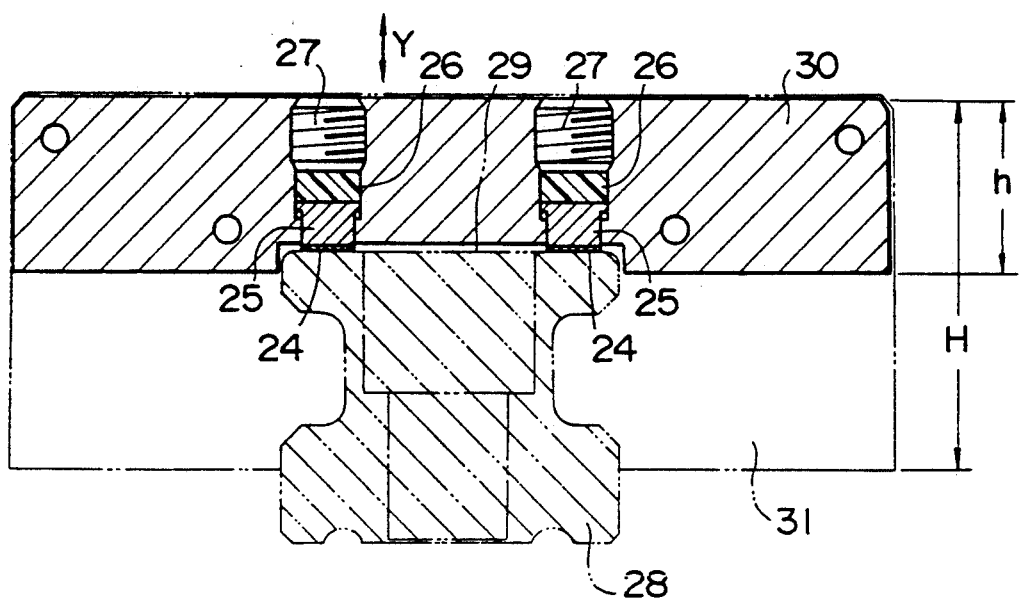
FIG. 4 is a schematic illustration showing in transverse cross section an anti-vibration linear motion guide unit constructed in accordance with another embodiment of the present invention.
Figure 5:
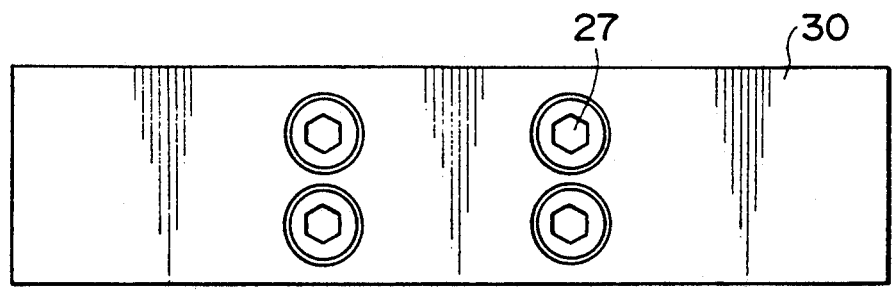
FIG. 5 is a schematic illustration showing in plan view the anti-vibration block provided in the linear motion guide unit shown in FIG. 4.
Figure 6:
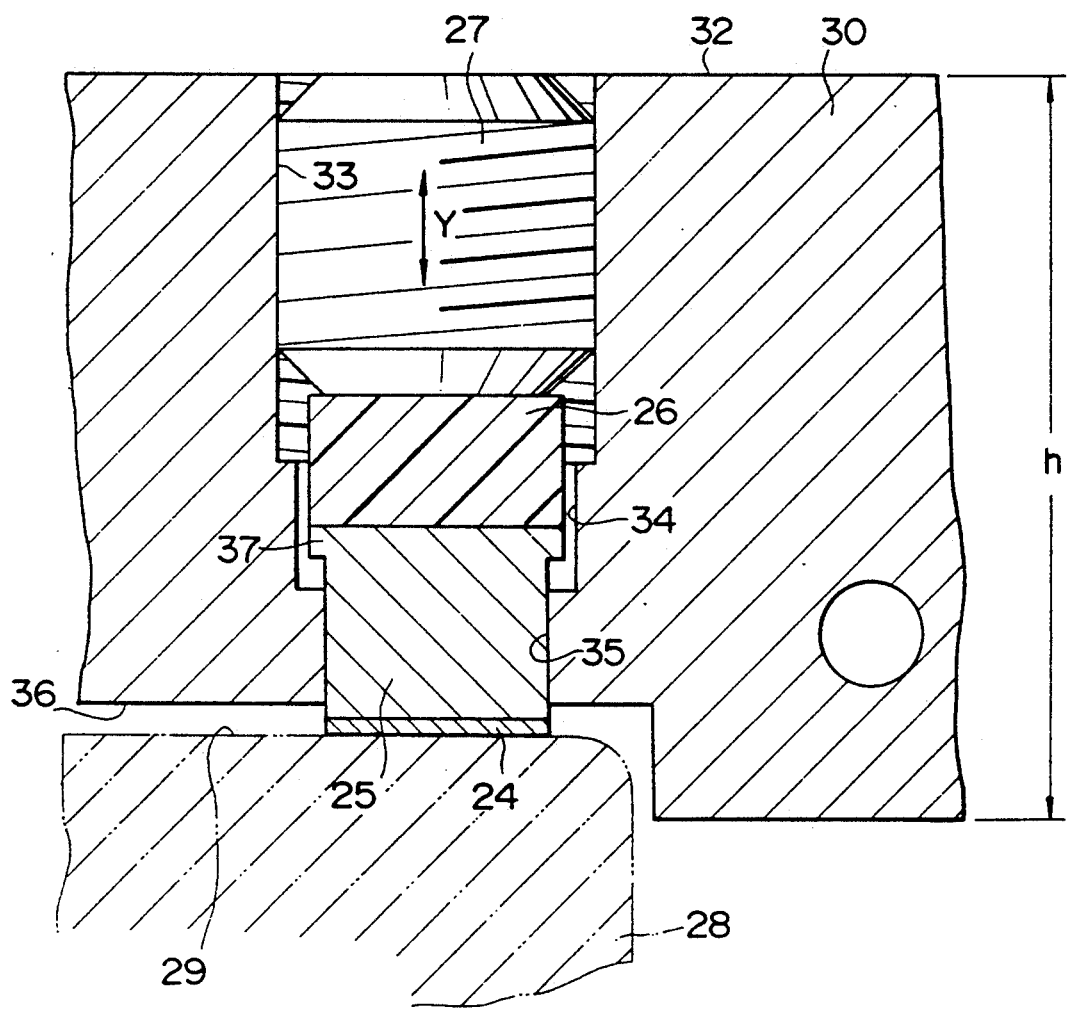
FIG. 6 is a schematic illustration showing on a somewhat enlarged scale an anti-vibration mechanism provided in the linear motion guide unit shown in FIGS. 4 and 5.

Referring now to FIGS. 4 through 6, there is schematically shown an anti-vibration linear motion guide unit constructed in accordance with another embodiment of the present invention. In the present anti-vibration linear motion guide unit also, an anti-vibration block 30 is provided at least at one end of the slider assembly. As shown in FIGS. 4 through 6, the present anti-vibration block 30 is formed with four holes provided with steps and partly threaded, and an anti-vibration mechanism is provided in each of the four holes. That is, a friction member 25 is disposed at the bottom of the hole with its bottom end having fixed thereto a contact sheet 24 which is comprised of a low friction material and which is normally in contact with a sliding guide surface 29 of a rail 28 under pressure. An elastic member 26, such as a spring or rubber, is disposed on top of the friction member 24 and an adjusting screw 27 is also provided with its bottom surface in contact with the top surface of the elastic member 26. With this structure, since the friction member 25 is normally biased downward under the force of the elastic member 26, any vibration or fluctuation occurring between the rail 28 and the linear motion guide unit can be absorbed by the elastic member 26.

In the structure of the present embodiment as described above, the anti-vibration block 30 has a height h which can be approximately half of the height H of the slider assembly 31, so that the overall size and weight of the present linear motion guide unit can be minimized. Moreover, since the anti-vibration block 30 is substantially rectangular in shape, it is extremely easy to manufacture and thus low at cost.

Described more in detail with reference to FIG. 6, a hole is formed in the anti-vibration block 30 extending therethrough from its top surface 32 to its bottom surface 36 and its upper portion 33 of the hole is threaded, and then a portion 34 having a first diameter smaller than the diameter of the threaded hole portion 33 is provided therebelow. And, below the first diameter portion 34 is provided a second diameter portion 35 whose diameter is smaller than the first diameter and the second diameter portion 35 opens into the bottom surface 36 of the anti-vibration block 30. The friction member 25 is generally cylindrical in shape and slidably extends through the second diameter portion 35. The friction member 25 is formed with a flange 37 at its top and the flange 37 has a diameter slightly larger than the second diameter but slightly smaller than the first diameter. The contact sheet 24 of a low friction material is fixedly attached to the bottom surface of the friction member 25. Thus, the contact sheet 24 is in sliding contact with the sliding guide surface 29 of the rail 28 and the friction member 25 is prevented from slipping away through an engagement between the flange 37 and a step between the first and second diameter portions 34 and 35.

The elastic member 26 is generally cylindrical in shape and sits on top of the friction member 25. The cylindrical elastic member 26 has a diameter slightly smaller than the diameter of the first diameter portion 34 and thus it can move freely within the confines of the hole. The elastic member 26 extends well into the space defined by the threaded portion 33. The adjusting screw 27 is screwed into the threaded portion 33 with its bottom surface in abutment against the top surface of the elastic member 26. With this structure, by adjusting the location of the adjusting screw 27 within the threaded portion 33, the friction member 25 and thus the contact sheet 24 fixedly attached to its bottom surface may be brought into contact with the sliding guide surface 29 under pressure through the elastic member 26. Any desired contact pressure condition can be set by adjusting the position of the screw 27 as indicated by a double arrow Y. Under the condition, if any vibration or fluctuation occurs between the rail 28 and the slider assembly 31, such vibration or fluctuation can be advantageously absorbed by the elastic member 26.

While the above provides a full and complete disclosure of the preferred embodiments of the present invention, various modifications, alternate constructions and equivalents may be employed without departing from the true spirit and scope of the invention. For example, both of the above-described embodiments may be applied to the same linear motion guide unit, if desired. Besides, while the above-described embodiments are both of the roller type, the present invention is equally applicable to any other type of linear motion guide units, such as the ball type which uses balls as rolling members. Therefore, the above description and illustration should not be construed as limiting the scope of the invention, which is defined by the appended claims.

What is claimed is:

1. A linear motion guide unit comprising:
   a rail extending over a length, said rail including first guiding means and at least one sliding surface;
   a slider assembly slidably mounted on said rail, said slider assembly including second guiding means;
   a plurality of rolling members interposed between said first and second guiding means to thereby provide a rolling contact between said rail and said slider assembly;
   at least one anti-vibration block fixedly attached to an end of said slider assembly, said anti-vibration block including a friction member and holding means for holding said friction member against said sliding surface under pressure; and
   wherein said holding means includes a hole formed in said anti-vibration block for slidably holding therein said friction member, a biasing means for biasing said friction member toward said sliding surface and a stopper for stopping the movement of said biasing means in a predetermined direction.

2. The unit of claim 1, wherein said friction member is provided with a contact sheet of a predetermined material at its forward end surface.

3. The unit of claim 1, wherein said biasing means includes an elastic member.

4. The unit of claim 1, wherein said hole is formed with a threaded portion and said stopper is a screw which can be screwed into said threaded portion.

5. The unit of claim 1, wherein said holding means further includes a buffer member interposed between said biasing means and said stopper.

6. The unit of claim 1, wherein said sliding surface is formed at a side surface of said rail and said friction member is disposed horizontally.

7. The unit of claim 1, wherein said sliding surface is formed at a top surface of said rail and said friction member is disposed vertically.

8. The unit of claim 1, wherein said slider assembly includes a main block and a pair of end blocks attached to opposite ends of said main block.

* * * * *